(12) United States Patent
Stephenson et al.

(10) Patent No.: US 11,577,217 B2
(45) Date of Patent: Feb. 14, 2023

(54) DOPANT FLUID STORAGE AND DISPENSING SYSTEMS UTILIZING HIGH PERFORMANCE, STRUCTURALLY MODIFIED PARTICULATE CARBON ADSORBENTS

(71) Applicants: Neil A. Stephenson, E Amherst, NY (US); Douglas C. Heiderman, Akron, NY (US); Ashwini K. Sinha, East Amherst, NY (US); Rachael A. Masin, East Amherst, NY (US); Garrett R. Swindlehurst, Tonawanda, NY (US); Cynthia A. Hoover, Grand Island, NY (US); William S. Kane, Tonawanda, NY (US)

(72) Inventors: Neil A. Stephenson, E Amherst, NY (US); Douglas C. Heiderman, Akron, NY (US); Ashwini K. Sinha, East Amherst, NY (US); Rachael A. Masin, East Amherst, NY (US); Garrett R. Swindlehurst, Tonawanda, NY (US); Cynthia A. Hoover, Grand Island, NY (US); William S. Kane, Tonawanda, NY (US)

(73) Assignee: Praxair Technology, Inc., Danbury, CT (US)

( * ) Notice: Subject to any disclaimer, the term of this patent is extended or adjusted under 35 U.S.C. 154(b) by 540 days.

(21) Appl. No.: 16/711,556

(22) Filed: Dec. 12, 2019

(65) Prior Publication Data
US 2021/0178361 A1 Jun. 17, 2021

(51) Int. Cl.
*B01J 20/20* (2006.01)
*B01J 20/28* (2006.01)
*B01J 20/32* (2006.01)

(52) U.S. Cl.
CPC ........ *B01J 20/20* (2013.01); *B01J 20/28004* (2013.01); *B01J 20/28019* (2013.01); *B01J 20/28054* (2013.01); *B01J 20/28064* (2013.01); *B01J 20/28066* (2013.01); *B01J 20/3208* (2013.01)

(58) Field of Classification Search
CPC ............................ B01J 20/28054; B01J 20/20
See application file for complete search history.

(56) References Cited

U.S. PATENT DOCUMENTS

| 5,704,967 A | 1/1998 | Tom et al. |
| 5,937,895 A | 8/1999 | Le Febre et al. |
| 6,006,797 A | 12/1999 | Bulow et al. |
| 6,007,609 A | 12/1999 | Semerdjian et al. |
| 6,045,115 A | 4/2000 | Martin, Jr. et al. |
| 6,309,446 B1 | 10/2001 | Nakanoya et al. |
| 6,592,653 B2 | 7/2003 | Wang et al. |

(Continued)

FOREIGN PATENT DOCUMENTS

WO 2013/155499 A1 10/2013

*Primary Examiner* — Stuart L Hendrickson
(74) *Attorney, Agent, or Firm* — Nilay S. Dalal

(57) ABSTRACT

A carbon adsorbent storage and dispensing system is provided with a structurally modified particulate carbon adsorbent designed with optimal volumetric surface area for a certain range of particle sizes. Bulk density and specific surface area are carefully balanced to ensure the volumetric surface area remains within an optimal range to create high performance, as measured by dispensing capacity of the dopant fluid that is reversibly adsorbed onto the structurally modified particulate carbon adsorbent.

21 Claims, 3 Drawing Sheets

(56) References Cited

U.S. PATENT DOCUMENTS

| | | |
|---|---|---|
| 7,288,504 B2 | 10/2007 | Von Bluecher et al. |
| 7,708,028 B2 | 5/2010 | Brown et al. |
| 7,905,247 B2 | 3/2011 | Campeau |
| 8,147,589 B2 | 4/2012 | Schonfeld et al. |
| 9,234,628 B2 | 1/2016 | Wilson et al. |
| 9,909,670 B2 | 3/2018 | Heiderman et al. |
| 10,335,763 B2 | 7/2019 | Petruska et al. |

Arsine Deliverable Capacity versus Volumetric Surface Area for Structurally Modified Carbon Adsorbent Samples

DOPANT FLUID STORAGE AND DISPENSING SYSTEMS UTILIZING HIGH PERFORMANCE, STRUCTURALLY MODIFIED PARTICULATE CARBON ADSORBENTS

FIELD OF INVENTION

This invention generally relates to carbon adsorbent systems for storing and dispensing dopant fluids that are reversibly adsorbed onto a structurally modified particulate carbon adsorbent. Particularly, the invention relates to carbon adsorbent systems with structurally modified particulate carbon adsorbents with a certain particle size having an optimal volumetric surface area when packed into an interior volume of a vessel.

BACKGROUND OF THE INVENTION

There has been a need for a reliable source of dopant fluid(s) for a wide variety of industrial applications. Many industrial processing and manufacturing applications require the use of highly toxic dopant gases. The manufacture of semiconductor materials represents one such application wherein the safe storage and handling of highly toxic hydride or halide gases and mixtures thereof becomes necessary. Examples of such gases include silane, germane, ammonia, phosphine, arsine, boron trifluoride, stibine, hydrogen sulfide, hydrogen selenide, hydrogen telluride, phosphorous trifluoride, arsenic pentafluoride and other halide or hydride compounds and gas mixtures thereof. As a result of toxicity and safety considerations, these gases must be carefully stored and handled in the industrial process facility.

The semiconductor industry in particular relies on various gaseous sources, such as, for example, arsine and phosphine, hydrogen selenide, boron trifluoride, diborane, silicon tetrafluoride, germanium tetrafluoride, selenium hexafluoride, carbon monoxide and carbon dioxide as sources of arsenic, phosphorus, boron, silicon, germanium, selenium and carbon in ion implantation. Ion implantation systems typically require the usage of pure gases such as arsine and phosphine stored as liquefied compressed gases at their respective vapor pressures and pure gases such as boron trifluoride and silicon tetrafluoride stored at pressures as high as 1500 psig within the delivery vessel. Due to their extreme toxicity and high vapor pressure, their use, transportation and storage raise significant safety concerns for the semiconductor industry.

To address the various safety concerns, there have been a number of systems developed to deliver these hydride and halide compounds to the ion implant tool at sub-atmospheric conditions. Device safety requires delivery of the gas at sub-atmospheric pressures so that if the valve opens to atmosphere, no gas will leak out of the cylinder. A vacuum condition must be applied to the cylinder to obtain flow of gas. As such, a fail-safe vacuum-actuated valve design is required. A number of mechanical systems have been developed for the sub-atmospheric delivery of dopant gases. Some involve the use of a pressure regulator, while others require valve devices to control and deliver the product sub-atmospherically. These valve devices are set to deliver or open when sub-atmospheric or vacuum conditions are applied to the delivery port of the cylinder. The exact location of these devices can be in the port body, in the neck cavity, or inside the cylinder itself. In each case, the pressure regulator or valve device is located upstream of the cylinder valve seat with respect to flow of gas from the interior of the cylinder to the delivery port. A primary drawback of the mechanical systems is that many of the toxic gases are stored at high pressures (e.g., 500 psi or greater) within the cylinder. For example, the mechanical systems can fail, such as by way of a leak, thereby defeating the safety design objective of the mechanical systems. The potential for a leak or other type of failure for certain mechanical systems is low, but, nonetheless, some end-users are unwilling to accept any risk when handling highly toxic gases. Additionally, certain regulatory authorities do not permit the usage of high pressure storage systems in a semiconductor fabrication environment.

To eliminate higher pressure storage, an alternative approach involves deploying a solid adsorbent loaded within a cylinder as part of an adsorbent storage and dispensing system. Several commercial adsorbent storage and dispensing systems exist today. However, many of these systems fail to exhibit satisfactory performance. For example, many of the adsorbent-based systems do not exhibit a sufficient deliverable capacity of the gases between storage and release operating conditions. Others fail to exhibit sufficient loading capacity of the particular gas to be used. Yet, other adsorbent-based systems do not possess a sufficient loading capacity and a sufficient deliverable capacity.

In view of these drawbacks, there is an unmet need for higher performance carbon adsorbent-based systems that operate in a safe and reliable manner.

SUMMARY OF THE INVENTION

In one aspect, a carbon adsorbent storage and dispensing system comprising a vessel and a structurally modified particulate carbon adsorbent disposed within an interior volume of the vessel, said structurally modified particulate carbon adsorbent comprising a synthetic polymer-based material, the structurally modified particulate carbon adsorbent further comprising particles having a particle size at or below about 0.5 mm but no less than about 0.15 mm, the structurally modified particulate carbon adsorbent further having modified structural characteristics to allow packing into the vessel as free flowing particles to generate a volumetric surface area (VSA) therewithin of greater than about 800 $m^2$ of porous surface area per cc of a packed volume of the vessel, the structurally modified carbon adsorbent further configured to reversibly adsorb a dopant fluid that is stored at a storage pressure of less than 1 bar at 20 deg C.

In a second aspect, a carbon adsorbent storage and dispensing system comprising a vessel and a structurally modified particulate carbon adsorbent disposed within an interior volume of the vessel, said structurally modified particulate carbon adsorbent comprising a synthetic polymer-based material, the structurally modified particulate carbon adsorbent further comprising particles having a particle size at or below about 0.5 mm but no less than 0.15 mm, the structurally modified particulate carbon adsorbent further having modified structural characteristics to allow packing into the vessel as a free flowing particles to generate a volumetric surface area (VSA) therewithin of greater than about 800 $m^2$ of porous surface area per cc of a packed volume of the vessel, the structurally modified carbon adsorbent further configured to reversibly adsorb a dopant fluid that is stored at a storage pressure of less than 1 bar at 20 deg C., wherein said structurally modified particulate carbon adsorbent is characterized by a dispensing capacity of 210 or more grams per liter of the structurally particulate modified carbon adsorbent when the dopant fluid is arsine.

DETAILED DESCRIPTION OF THE INVENTION

Figure 1:
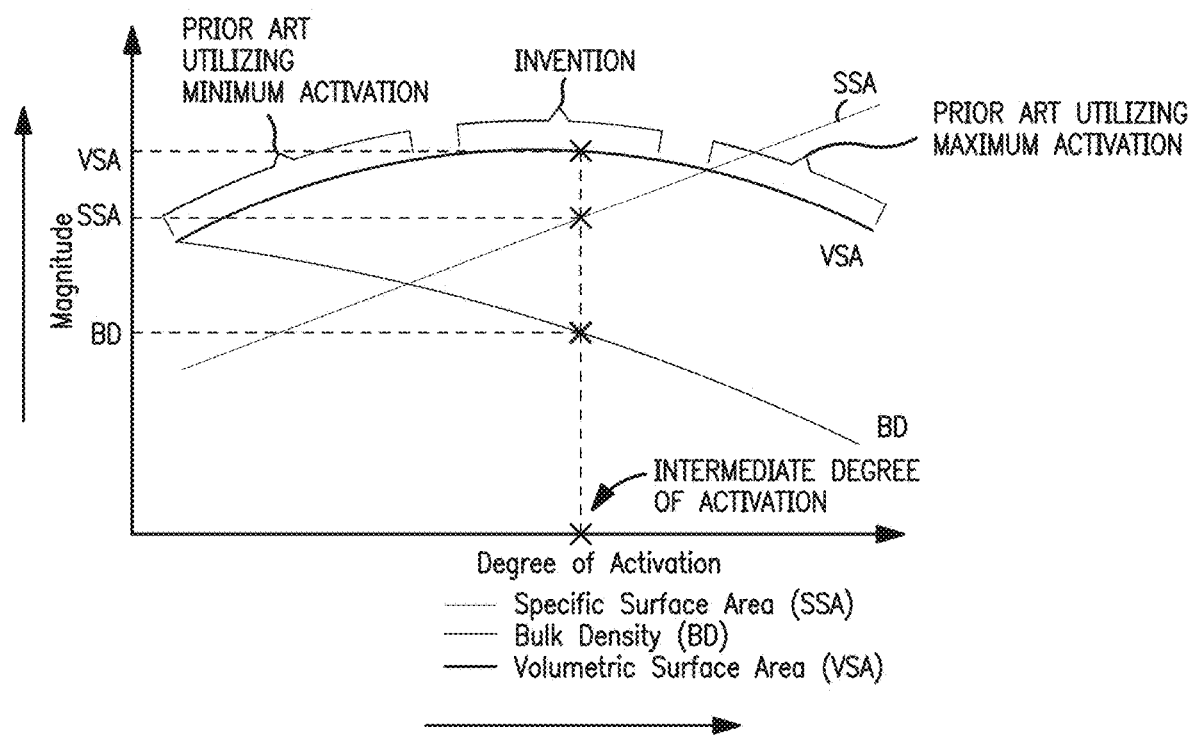
FIG. 1 is a curve intending to illustrate volumetric surface area, bulk density, and specific surface area as a function of degree of activation for a certain range of particle sizes and further illustrates the optimal operating regime of the present invention in contrast to the operating regimes of prior art systems.

The present invention is a paradigm shift in the design of improved performance carbon adsorbent dispensing systems. As will be described, in one aspect, the present invention offers carbon adsorbent based storage and dispensing systems with a particulate carbon adsorbent with a unique combination of structural features that allow an optimal volumetric surface area, which produces relatively higher dispensing capacities of dopant fluid than previously attainable with several commercially available systems. The improvements of the present invention primarily stem from a shift in design criteria commonly used before emergence of the present invention.

The term "tap bulk density" and "packing density" and "bulk density" may be used interchangeably herein and as is intended to mean a ratio of the mass of the material to the so-called "settled volume" of the material occupying a finite volume, where a known weight of the material has been filled into a 250 mL graduated cylinder and the filled cylinder is placed in a rototap apparatus for 5000 cycles. Upon completion of the 5000 cycles, the "settled volume" is measured from which the tap bulk density is determined.

The term "count based method" as used herein means a laser-based technique as known in the art for determining the average particle size using dynamic range analysis. The technique can be performed using various commercially available equipment, such as the Camsizer® P4 particle analyzer commercially available from Retsch Technology.

The term "vessel" as used herein refers means any storage, filling, delivery or transportable vessel capable of receiving a carbon adsorbent with dopant fluid reversibly adsorbed thereon, including but not limited to cylinders, containers, dewars, bottles, tanks, barrels, bulk and microbulk.

The term "dopant fluid" as used herein refers to a gas, vapor, liquid, multiphase dopant fluid, including mixtures as well as single component dopant fluids.

The term "deliverable capacity" or "dispensing capacity" as used herein refers to the amount of dopant fluid that can be desorbed from the porous structure of a particulate carbon adsorbent, expressed in units of weight of dopant fluid per unit volume of adsorbent, when the pressure decreases from 650 Torr to 20 Torr at a temperature of 20° C.+/−1° C., unless indicated otherwise.

The term "specific surface area" as used herein refers to the surface area of the micropores of a particulate carbon adsorbent per unit mass of the particulate carbon adsorbent, typically expressed in units of $m^2$ per grams of the particulate carbon adsorbent, unless specified otherwise, where the values for the specific area are measured by ASTM 6556-04 (BET N2, 77K).

"Conduit" or "conduit flow network" as used herein means tube, pipe, hose, manifold and any other suitable structure that is sufficient to create one or more flow paths and/or allow the passage of a dopant fluid.

"Connected" or "operably connected" as used herein means a direct or indirect connection between two or more components, so as to enable fluid, mechanical, chemical and/or electrical communication between the two or more components.

The term "size" or "particle size" is intended to mean an average diameter or average effective diameter as measured by the count-based method, whereby the shape of the particle can be spherical or irregular shaped.

The term "particulate" is intended to include any free flowing form including beads, pellets, extrudates, powders, granules.

The embodiments as described below are by way of example only, and the invention is not limited to the embodiments illustrated in the drawings. It should also be understood that the drawings are not to scale and in certain instances details have been omitted, which are not necessary for an understanding of the embodiments, such as conventional details of fabrication and assembly. It should also be understood that certain features are intentionally omitted in each of the drawings to better illustrate various aspects of the principles of the present invention.

The embodiments are described with reference to the drawings in which similar elements are referred to by like numerals. The relationship and functioning of the various elements of the embodiments are better understood by the following detailed description. The detailed description contemplates the features, aspects and embodiments in various permutations and combinations, as being within the scope of the disclosure. The disclosure may therefore be specified as comprising, consisting or consisting essentially of, any of such combinations and permutations of these specific features, aspects, and embodiments, or a selected one or ones thereof.

Prior to the emergence of the present invention, a prevailing design objective for carbon adsorbent storage and dispensing systems has been to maximize surface area per unit mass of particulate carbon materials ("specific surface area"). Maximizing specific surface area exfoliates the carbon material to produce a large number of mesopores and micropores that are believed to be potentially available for dopant fluid entrapment during storage, thereby increasing loading capacity of the material.

Yet others have focused on higher utilization materials having low heels whereby only a relatively small fraction of the original amount of dopant fluid remains adsorbed on the carbon adsorbent during a dispensing operation, with a majority of the dopant fluid having reversibly desorbed from the material during the dispensing operation. For example, U.S. Pat. No. 6,592,653 describes carbon adsorbents where the bulk density is less than 0.5 g/cc as the means to maximize the surface area of the carbon adsorbents.

The present invention has determined that many of the carbon adsorbent storage and dispensing systems based on either of the above mentioned design criteria do not offer optimal performance. "Performance" as used herein is measured in terms of deliverable capacity of the dopant fluid reversibly adsorbed onto specifically tailored structurally modified carbon adsorbent particulates during a dispensing operation. The present invention has determined that bulk density and specific surface area, which are competing variables, must be balanced in order to optimize a volumetric surface area (i.e., also referred to as "VSA"). However, the present invention further recognizes that VSA by itself is not sufficient to optimize performance of the carbon adsorbent storage and dispensing systems. In this regard, the inventors have discovered that the VSA of the adsorbent must be optimized in combination with a particle size that is at or below about 0.5 mm but no less than 0.15 mm. The VSA (e.g., expressed in units of $m^2$ of material per cubic centimeter ("cc") of vessel volume) is determined from the multiplication product of the bulk density (e.g., expressed in units of grams of material per cc of vessel volume) and the specific surface area (e.g., units of $m^2$ of material per gram of material). Relatively lower VSA's are located to the left and right of the inventive operating regime in FIG. 1, which will be discussed in greater detail hereinbelow. The present invention recognizes that lower levels of VSA's produce inferior performing carbon storage and dispensing systems for dopant fluids. The VSA provides a numerical indicator of the porosity per unit volume and can be more specifically expressed as the porosity per unit packed vessel volume for a particulate carbon adsorbent (e.g., beaded or granular material). Accordingly, the carbon adsorbent storage and dispensing system of the present invention is distinguishable from the prior art at least on the basis of being designed around an optimal VSA operating regime, as clearly illustrated in FIG. 1, for carbon adsorbent particulates having a particle size at or below about 0.5 mm but no less than about 0.15 mm.

FIG. 1 shows a generalized graphical relationship of VSA, bulk density and specific surface area as a function of the degree of activation of a particular carbon adsorbent. The x-axis is intended to show an increase in activation moving from left to right along the x-axis, and the y-axis is intended to show an increase in magnitude of VSA, bulk density and specific surface area moving from bottom to top along the y-axis. Referring to FIG. 1, for a given intermediate degree of activation of a particular carbon adsorbent particulate having a particle size at or below about 0.5 mm but no less than 0.15 mm and as indicated by "x" on the x-axis, the structurally modified particulate carbon adsorbent has a corresponding specific surface area value and a corresponding bulk density value such that the multiplication product of the bulk density value and the specific area value yields an optimal VSA value for dispensing dopant fluids. The relative magnitude of each of the specific surface area, bulk density and VSA is graphically shown on the y-axis. The "x" represents one example of a combination of bulk density, specific surface area and VSA values for carbon adsorbent particle sizes ranging from 0.15 mm to 05 mm. The bracketed "invention" regime represents the complete range of bulk density, specific surface area and optimal VSA values for particulate carbon adsorbents having a particle size at or below about 0.5 mm but no less than 0.15 mm.

It should be understood that the term "intermediate degree of activation" as used herein means a certain level of activation of the particulate carbon adsorbent material that decomposes a portion of the starting carbon material in an amount that is less than a maximum degree of activation corresponding to the bracketed operating regime entitled "prior art utilizing a maximum activation", but where the amount is greater than a minimum degree of activation corresponding to the bracketed operating regime entitled "prior art utilizing a minimum activation". The activation can occur as described in U.S. Pat. Nos. 6,309,446; 7,288,504; 8,147,589; and 9,234,628, each of which is herein incorporated by reference in their respective entireties. The present invention requires a structurally modified particulate carbon adsorbent carbon that has underwent a controlled degree of intermediate activation, as shown in FIG. 1, in combination with a particle size at or below about 0.5 mm but no less than about 0.15 mm Preferably, a synthetic polymer-based carbon material in substantially spherical or non-spherical form is employed in the present invention, but other types of carbon-based activated materials can be employed. FIG. 1 is intended to show, among other aspects, the impact of degree of activation on VSA. The inventors have recognized that the bulk density does not decrease linearly with increased degrees of activation, and as a result, the multiplication product of specific surface area and bulk density will generate a VSA curve that goes through a maximum as shown in FIG. 1. Utilizing an overly activated carbon adsorbent material will create an insufficient VSA as a result of a bulk density that has been excessively reduced by a maximum degree of activation, thereby resulting in materials with characteristics corresponding to the specific surface area, bulk density and VSA curves to the right of the inventive operating regime in FIG. 1. Conversely, utilizing under activated materials will create insufficient VSA's as a result of unacceptably low specific surface areas produced by a minimum degree of activation, thereby resulting in materials with characteristics corresponding to the specific surface area, bulk density and VSA curves to the left of the inventive operating regime in FIG. 1.

The correlation of VSA in combination with a certain range of particle sizes for a structurally modified carbon adsorbent to deliverable capacity has been discovered by the inventors. The Examples 1-5 and Comparative Examples 1-2 provided below validate the correlation. Specifically, the amount of arsine dispensed, expressed in units of g/L of adsorbent, from various different structurally modified particulate carbon adsorbents is higher with higher volumetric surface areas of the adsorbents for adsorbents having a particle size within a certain range as will be discussed.

In one embodiment, a carbon adsorbent storage and dispensing system comprising a vessel and a structurally modified particulate carbon adsorbent disposed within an interior volume of the vessel is provided to dispense arsine to a downstream process, such as an ion implant tool as part of an arsine-containing ion implantation process. The structurally modified particulate carbon adsorbent has a VSA greater than about 800 $m^2$/cc to realize the benefit of higher dispensing capacities of dopant fluid reversibly adsorbed onto the structurally modified carbon adsorbent; and a particle size that ranges from 0.15 mm to 0.50 mm. A significant benefit achieved with higher deliverable capacities with arsine and other dopant gases utilized for ion implant processes is extended carbon adsorbent storage and dispensing lifetime. The extended vessel lifetime enables longer on-tool times and reduces changeout frequency during the ion implantation process. In this manner, the risks associated with vessel changeouts is significantly reduced.

Figure 2:
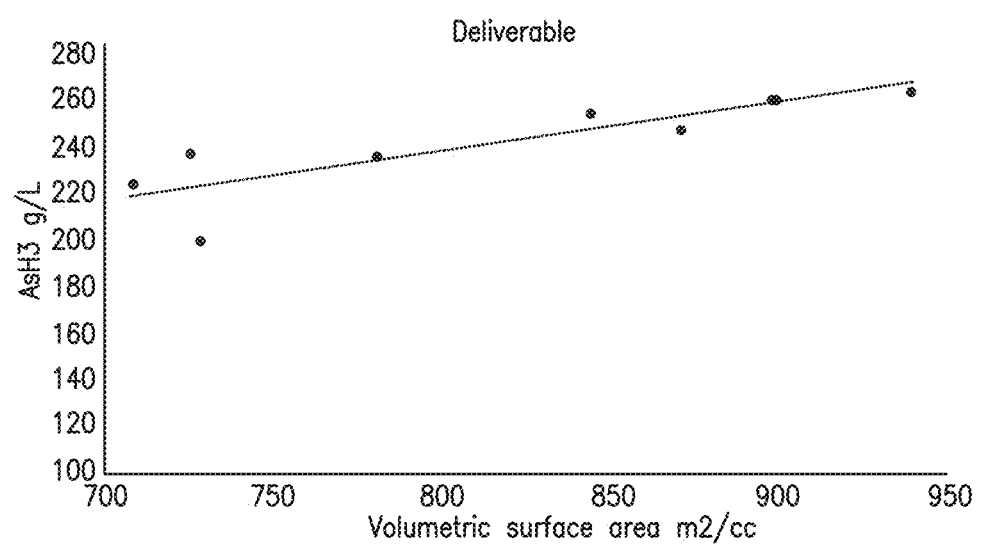
FIG. 2 shows the amount of arsine dispensed, expressed in units of g of arsine/L of adsorbent, from different structurally modified particulate carbon adsorbent samples of different volumetric surface areas for a certain range of particle sizes.

The volumetric surface area is greater than at least 800 $m^2$/cc as shown in FIG. 2. FIG. 2 shows a curve of deliverable capacity of arsine fluid versus volumetric surface area for different structurally modified particulate carbon adsorbents. Applicants constructed the curve by performing several different tests that utilized different structurally modified carbon particulate adsorbent samples of different volumetric surface areas. In other words, each datapoint represents a test utilizing a different structurally modified particulate carbon adsorbent. The test procedure is described below with regards to the Comparative Examples 1-2 and Examples 1-5. The curve of FIG. 2 indicates that the amount of arsine dispensed per liter of adsorbent (dispensing capacity) increases at volumetric surface areas greater than 800 m$^2$/cc for carbon adsorbent particulates having a particle size ranging from 0.15-0.5 mm. Each of the five datapoints showing arsine deliverable capacity at a VSA greater than 800 m$^2$/cc in FIG. 2 corresponds to Examples 1, 2 3, 4 and 5 described below. The captioned operating regime in FIG. 2 labelled as "invention" and is intended to define one aspect of the invention in which a structurally modified particulate adsorbent with a particle size ranging from 0.15 mm to 0.5 mm is designed to be effectively packed into an interior volume of a vessel such that the VSA is greater than 800 m$^2$/cc to significantly improve arsine dispensing capacity.

It should be understood that the present invention can be used with other dopant fluids. For example, other dopant gases such as arsine, phosphine, boron trifluoride, hydrogen selenide, diborane, silicon tetrafluoride, germanium tetrafluoride, germane and any other suitable dopant fluid capable of being sorbed and desorbed from the structurally modified particulate carbon adsorbents described herein can be employed with the structurally modified carbon adsorbent storage and dispensing systems of the present invention. The dispensing capacity of such other dopant fluids is expected to behave similarly to that of FIG. 2, whereby the deliverable capacity during a dispensing operation increases when utilizing structurally modified particulate carbon adsorbents with higher levels of VSA's and a particle size no greater than 0.5 mm but equal to or higher than 0.15 mm. In one embodiment, phosphine, boron trifluoride, hydrogen selenide, diborane, silicon tetrafluoride, germanium tetrafluoride, germane or any other suitable dopant fluid is reversibly adsorbed onto a structurally modified carbon adsorbent having a VSA greater than 800 but less than or equal to 900 m$^2$ of porous surface area per cc of a packed volume of the vessel with a particle size ranging from 0.15 mm to 0.5 mm, or more preferably from 0.2 to 0.475 mm. In another embodiment, the VSA ranges from 875 to 900 m$^2$/cc or higher, more preferably 850 to 875 m$^2$/cc, and most preferably 800 to 850 m$^2$/cc with a particle size ranging from 0.15 mm to 0.5 mm, or more preferably from 0.2 to 0.475 mm. The compatibility of the present invention to other dopant fluids (e.g., dopant gases) offers wide-ranging benefits in a variety of process applications that require a consistent supply of dopant fluid with minimal process downtime disruption, thereby significantly increasing throughput and reducing associated risks of vessel changeouts. The present invention has determined that a structurally modified particulate carbon adsorbent designed with such VSA values has a microporous structure that produces relatively high dispensing capacities when incorporated as part of a carbon storage and dispensing system.

The present invention also contemplates a dispensing system with a structurally modified particulate carbon adsorbent having a VSA of 900 m$^2$ of porous surface area per cc of a packed volume of the vessel or higher in combination with a particle size of the structurally modified carbon adsorbent that ranges from 0.15 mm to 0.5 mm, or 0.20 mm to 0.45 m or 0.25 mm to 0.40 mm.

Surprisingly, the present invention is able to produce higher deliverable capacities for dopant fluids even though the specific surface area of the structurally modified carbon adsorbent is not maximized. Several prior art systems have focused on maximizing the specific surface area to maximize loading capacity. However, the optimal VSA ranges within the regime of the invention as denoted in FIG. 1 for certain particle sizes of 0.15 mm to 0.5 mm allow deliverable capacities that can be higher than that achieved with prior art systems even though the specific surface area of the structurally modified particulate carbon adsorbent is not maximized as has been done with many prior art systems. The present invention has an optimal VSA with an extensive microporous structure of adequate pore volume that is structurally configured for reversibly adsorbing dopant fluid during adsorption. In one embodiment, the structurally modified particulate carbon adsorbent can exhibit deliverable capacities of dopant fluid of 200 g/cc or higher, 220 g/cc or higher; 230 g/cc or higher; or 240 g/cc or higher. The higher deliverable capacities, as a result of the structural features of the adsorbent of the present invention (namely, optimized VSA and certain ranges of particle sizes), gives rise to high performance carbon adsorbent dispensing systems, thereby potentially increasing throughput in a variety of end-use and intermediate applications.

The characteristics that give rise to the optimal VSA values for certain particle size ranges employed as part of the carbon adsorbent storage and dispensing system will now be discussed. First, the tap bulk density as employed in the present invention is at least equal to 0.45 g/cc in order to avoid carbon adsorbent storage and dispensing systems with over activated carbon adsorbents, as depicted in the right hand portion of FIG. 1 entitled "prior art utilizing a maximum activation". In one embodiment, the bulk density can be up to 0.5 g/cc or higher, or up to 0.6 g/cc or higher. In another embodiment, the bulk density ranges from greater than 0.45 g/cc up to 0.7 g/cc, or from 0.45 to 0.6 g/cc or from 0.5 to 0.70 g/cc. It should be understood that while maintaining sufficient levels of bulk density is critical, there is an upper limit to the bulk density that is avoided by the present invention in order to avoid carbon adsorbent storage and dispensing systems with under activated carbon adsorbents, as depicted in the left hand portion of FIG. 1 entitled "prior art utilizing a minimum activation". As such, preferably, the bulk density is no greater than 0.7 g/cc.

In addition to the bulk density, the optimal VSA also has a certain range of specific surface areas. The specific surface area of the structurally modified particulate carbon adsorbent is greater than 1000 m$^2$/g, 1300 m$^2$/g or greater, or 1400 m$^2$/g or greater. In another embodiment, the specific surface area of the structurally modified particulate carbon adsorbent ranges from 1300 m$^2$/g up to 1800 m$^2$/g; or 1400 m$^2$/g to 1800 m$^2$/g; or 1500 m$^2$/g to 1800 m$^2$/g. Such ranges are intended to fall along the specific surface area curve bracketed within the inventive operating regime of FIG. 1.

The combination of a high specific surface area with a sufficient bulk density for particle sizes ranging from 0.15 mm to 0.5 mm as illustrated in FIG. 1 ensures that the VSA for a given carbon adsorbent particulate is optimized, thereby enabling the carbon adsorbent storage and dispensing system is configured to operate with improved dispensing capacity for a variety of dopant fluids. Prior to the present invention, many prior systems have focused on maximizing surface area per unit mass at the expense of losing an excessive amount of bulk density, because bulk density was merely considered a secondary design consideration. However, the present invention recognizes that (i) both the specific surface area and bulk density are competing variables that must be balanced to optimize the VSA; and furthermore (ii) such balancing must occur within the context of carbon adsorbent particle sizes ranging from 0.15 mm to 0.5 mm. As such, the exact bulk density in combination with the specific surface area for a given structurally modified particulate carbon adsorbent of the required particle size can depend on the ability to create and impart the required degree of intermediate activation into the carbon adsorbent. The ability for the material to have a relatively high specific surface area without excessive loss of bulk density is only possible by an intermediate degree of activation, as shown in FIG. 1, for a certain range of particle sizes.

The particles of the structurally modified particulate carbon adsorbent can have a size ranging from 0.5 mm down to about 0.15 mm. In another embodiment, the particle size ranges from 0.4 mm down to 0.15 mm. In yet another embodiment, the particle size ranges from 0.35 mm down to 0.2 mm, or 0.3 to 0.2 mm or 0.15 to 0.2 mm. Surprisingly, for a given degree of activation, as can be reflected in a gravimetric surface area measurement (i.e., traditional BET surface area measurement), the inventors have discovered that the tradeoff between specific surface area and bulk density is reduced or minimized for particles sizes within the range of 0.15 mm to 0.5 mm, and more preferably 0.2 mm to 0.475 mm, as there does not appear to be as large a drop-off in bulk density for a given amount of activation of the material. However, Applicants have discovered that handling issues arise when particle sizes drop below 0.15 mm thereby establishing the criticality to remain at or above 0.15 mm; and larger particle sizes beyond 0.5 mm have been observed by Applicants to be unable to achieve optimal VSA's, thereby establishing the criticality to remain at or below 0.5 mm.

Additionally, the pore size distribution is composed of substantially micropores with minimal amounts of mesopores and macropores as determined by mercury porosimetry. The mercury porosimetry analytical techniques utilize uptake of mercury under controlled pressures into the pores of the structurally modified particulate carbon adsorbent. The uptake of mercury into the pores is indicative of the volume percentage ("vol %") of mesopores and macropores which in the aggregate has a size ranging from 0.0035 micrometers to 12.5 micrometers, where the vol % is based on a total volume of solid pieces of the adsorbent. An AutoPoreIV 9500 porosimeter commercially available from Micrometrics Instruments Corporation was utilized by the inventors to generate the mesopore and macropore pore size data.

The inventors have performed extensive testing based on the mercury porosimetry analytical techniques described hereinabove to conclude that the performance benefits of the resultant activated structure are substantially or entirely attributed to the presence of a microporous structure with preferably less than 10 vol % of mesopores and macropores based on a total volume of solid pieces of the particulate adsorbent. The presence of mesopores and macropores are not imparting any characteristics that are beneficial to performance of the carbon adsorbent storage and dispensing system as measured in terms of the dispensing capacity. As such, the present invention contemplates a substantially microporous structure with less than 10 vol % of mesopores and macropores based on a total volume of solid pieces of the particulate adsorbent, whereby the substantially microporous structure can be defined as a micropore size less than about 2 nm (i.e., 20 Angstroms). Without being bound by a theory, it is believed that an increasing presence of a combination of mesopores or macropores can form as the result of over activating the material or activating the material in a non-selective manner such that numerous pores of a particle may under certain conditions tend to agglomerate into larger pores.

In one embodiment of the present invention, the particulate form is substantially spherical shaped. A substantially spherical shaped particle may tend to be more or less uniformly activated throughout the volume of the particle, such that the structurally modified particulate carbon adsorbent contains a well-balanced distribution and uniform size of micropores throughout the particle with less than 10 vol % of mesopores and macropores based on a total volume of the solid pieces of the particulate adsorbent. In contrast, other shaped particles, and in particular substantially non-spherical shaped particles which are significantly irregular shaped can have larger variation in their activation such that the structural characteristics that give rise to the optimal VSA values employed as part of the carbon adsorbent storage and dispensing system of the present invention may not be achieved. Additionally, the substantially spherical-shaped particles allow the bulk densities mentioned hereinbefore to be achieved, by virtue of substantially spherically-shaped particles having a structure that can be effectively packed within an interior volume of the vessel of the storage and dispensing system.

The substantially spherical shaped particles have a size that can range as previously described hereinabove. Other narrower ranges for the size are contemplated which fall within the broader range of 0.15 mm to 0.5 mm.

The activated carbon adsorbent is preferably a synthetic polymer-based material that is a non-carbohydrate, such as those that are based on styrene and divinylbenzene. Other examples include any of the synthetic polymer materials described in U.S. Pat. Nos. 6,309,446; 7,288,504; 8,147,589; and 9,234,628.

Figure 3:
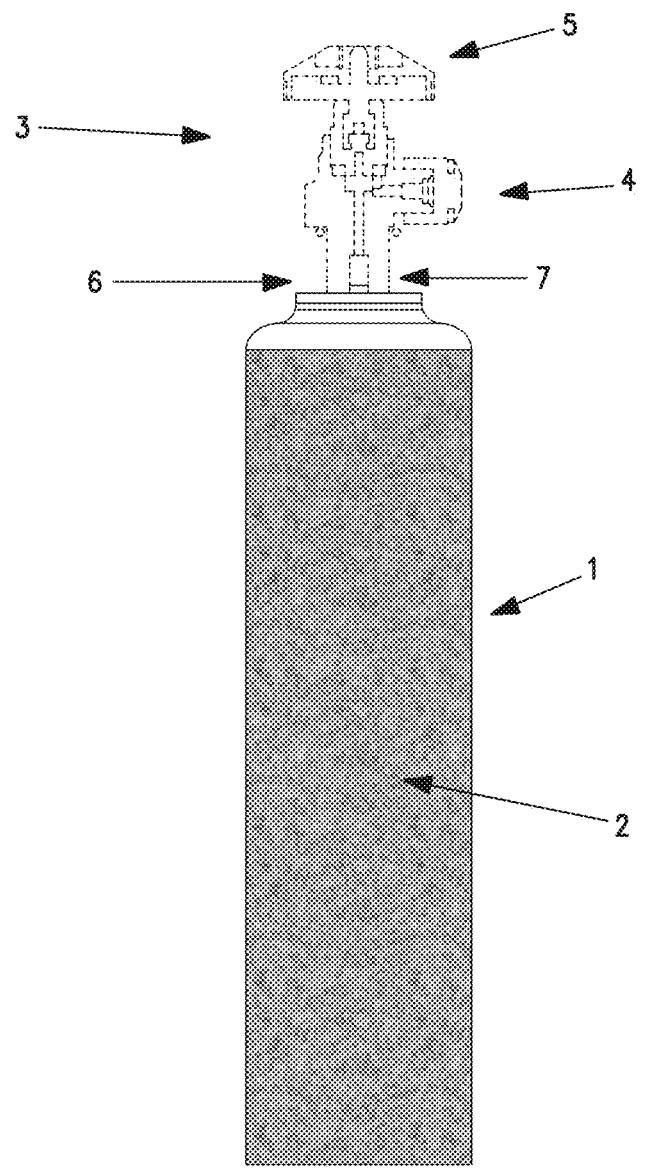
FIG. 3 shows a representative carbon adsorbent storage and dispensing system in accordance with the principles of the present invention.

A representative carbon adsorbent storage and dispensing system in accordance with the principles of the present invention is shown in FIG. 3. FIG. 3 shows a carbon adsorbent storage and dispensing system, with a structurally modified particulate carbon adsorbent (2) filled within an interior volume of a vessel (1). A cylinder valve (3) has threads which can be connected to the top of the vessel (1) along corresponding threads at the neck (6) of the vessel (1). The cylinder valve (3) includes a valve on/off handle (5), to allow dispensing of dopant fluid that is reversibly adsorbed onto the structurally modified particulate carbon adsorbent (2). A single port valve assembly is shown connected to the vessel (1). The outlet port (4) is shown, along which desorbed dopant fluid can flow out of the interior volume of the vessel (1). The outlet port (4) also serves as an inlet port for filling, along which dopant fluid can be introduced during adsorption of the dopant fluid onto the structurally modified particulate carbon adsorbent (2).

The carbon adsorbent storage and dispensing system may be coupled to any suitable downstream process. In one example, the carbon adsorbent storage and dispensing system may be coupled to a downstream ion implanter to enable arsine or phosphine to be dispensed to a downstream ion implanter, in which the arsine or phosphine is delivered at a controlled flow rate to the ion implanter where it undergoes ionization under appropriate ion implant conditions to yield arsine-containing or phosphorus-containing ions for subsequent implantation into a wafer. Other downstream processes are also contemplated, including, but not limited to, a semiconductor processing plant, a flat panel display manufacturing facility, organic synthesis equipment, a pharmaceutical manufacturing facility, an anesthesia gas dispensing mask, an air treatment or water pollution abatement facility, a combustion gas process, or any other suitable downstream process facility, for intermediate or end use of the gas dispensed from the carbon adsorbent storage and dispensing system of the present invention.

One or more of the carbon adsorbent storage and dispensing systems may be disposed in a gas cabinet. In such a gas cabinet arrangement involving a multiplicity of carbon adsorbent storage and dispensing systems, each of the systems may be manifolded together for selective delivery of dopant fluid desorbed from the structurally modified particulate carbon adsorbent from one or more of such carbon adsorbent storage and dispensing systems. The cabinet may further include independent thermocouples, or other temperature sensing/monitoring equipment and components, for preventing overheating of the system and/or other internal components of the gas cabinet.

In another embodiment, the use of the structurally modified particulate carbon adsorbent can be efficiently packed in a vessel for dopant gases that can be applied to storage where the pressure is substantially sub-atmospheric to atmospheric or above in connection with storage and dispensing systems that incorporate an UpTime® valves designed to ensure that a downstream vacuum condition is required to trigger product release. The UpTime® style valve is described in U.S. Pat. Nos. 7,905,247; 5,937,895; 6,007,609; 6,045,115; 7,708,028; and 9,909,670. each of which is hereby incorporated by reference in their entirety.

It should be understood that variations to the above described embodiments can be made without departing from the scope of the present invention. For example, a mixture of different adsorbents can be used, provided that each of the adsorbents falls within the contemplated particle size and VSA criteria. Additionally, it should be understood that any commercially available synthetic polymer particulate carbon adsorbents may be modified to meet the required attributes of the present invention with regards to VSA and particle size and then loaded into a dispensing vessel.

The features and characteristics of the carbon adsorbent storage and dispensing system are more fully illustrated by the following non-limiting Comparative Examples and Examples.

Example 1

A sample of synthetic polymer-derived structurally modified particulate carbon adsorbent was weighed and loaded into a sample vessel at a packing density of 0.5851 g/cc. The structurally modified particulate carbon adsorbent was pre-conditioned via heat and vacuum to remove in the aggregate moisture and air from the pores down to less than 1 ppm levels. The final vacuum condition in connection with the pre-conditioning of the vessel with loaded adsorbent was less than 50 mTorr or 0.05 torr. The structurally modified particulate carbon adsorbent had a size of 0.475 mm, a specific surface area of 1486 $m^2/g$ and a resultant volumetric surface area of 869 $m^2/cc$.

Arsine gas from a source cylinder was regulated through a mass flow controller to control the amount of arsine gas that was adsorbed into the sample vessel. The temperature of the adsorption process was maintained at 20° C.+/−1° C. The pressure in the sample vessel was measured to determine the endpoint of the filling. The filling was stopped once a storage pressure of approximately 650 torr was achieved and maintained (stable) in the sample vessel.

After the adsorption process was completed, the dispensing process was carried out. Arsine dopant fluid flow from the sample vessel was carried out by utilizing a pressure differential between the pressure in the interior volume of the sample vessel and a lower pressure exterior to the sample vessel, so that dopant fluid was desorbed from the modified particulate carbon adsorbent in the sample vessel and withdrawn from the sample vessel. As a result of the pressure differential, the arsine dopant fluid desorbed as arsine gas from the modified particulate carbon adsorbent, and subsequently was withdrawn from the interior of the sample vessel and flowed through a dispensing assembly. The arsine gas flowed through a mass flow controller which maintained substantially constant flow rate through a dispensing conduit during the dispensing operation. The dispensing of arsine gas occurred from a starting pressure of 650 torr within the sample vessel down to a final pressure of 20 torr in a temperature-controlled system where the temperature was maintained at 20° C.+/−1° C. The pressure in the sample vessels was measured during the dispensing operation. The desorption was stopped once a pressure of approximately 20 torr was achieved and maintained (stable) in the sample vessel. The flow through the mass flow controller was totalized to determine the total number of grams of gas removed from the sample vessels from 650 torr to 20 torr. The totalizer indicated a dispensing capacity of 228.73 grams of arsine per liter of the structurally modified particulate carbon adsorbent. This example validated that a sufficiently high VSA greater than 800 $m^2/cc$ for particle sizes ranging from within 0.15 to 0.5 mm produced acceptable performance.

Example 2

A sample of synthetic polymer-derived structurally modified particulate carbon adsorbent was weighed and loaded into a sample vessel at a packing density of 0.4853 g/cc. The structurally modified particulate carbon adsorbent was preconditioned via heat and vacuum to remove in the aggregate moisture and air from the pores down to less than 1 ppm levels. The final vacuum condition in connection with the pre-conditioning of the vessel with loaded adsorbent was less than 50 mTorr or 0.05 torr. The structurally modified particulate carbon adsorbent had a particle size of 0.457 mm, a specific surface area of 1736 $m^2/g$ and a resultant volumetric surface area of 842 $m^2/cc$.

Arsine gas from a source cylinder was regulated through a mass flow controller to control the amount of arsine gas that was adsorbed into the sample vessel. The temperature of the adsorption process was maintained at 20° C.+/−1° C. The pressure in the sample vessel was measured to determine the endpoint of the filling. The filling was stopped once a storage pressure of approximately 650 torr was achieved and maintained (stable) in the sample vessel.

After the adsorption process was completed, the dispensing process was carried out. Arsine dopant fluid flow from the sample vessel was carried out by utilizing a pressure differential between the pressure in the interior volume of the sample vessel and a lower pressure exterior to the sample vessel, so that dopant fluid was desorbed was from the modified particulate carbon adsorbent in the sample vessel and withdrawn from the sample vessel. As a result of the pressure differential, the arsine dopant fluid desorbed as arsine gas from the modified particulate carbon adsorbent, and subsequently was withdrawn from the interior of the sample vessel and flowed through a dispensing assembly. The arsine gas flowed through a mass flow controller which maintained substantially constant flow rate through a dispensing conduit during the dispensing operation. The dispensing of arsine gas occurred from a starting pressure of 650 torr within the sample vessel down to a final pressure of 20 torr in a temperature-controlled system where the temperature was maintained at 20° C.+/−1° C. The pressure in the sample vessels was measured during the dispensing operation. The desorption was stopped once a pressure of approximately 20 torr was achieved and maintained (stable) in the sample vessel. The flow through the mass flow controller was totalized to determine the total number of grams of gas removed from the sample vessels from full vacuum 650 torr to 20 torr. The totalizer indicated a dispensing capacity of 213.57 grams of arsine per liter of the structurally modified particulate carbon adsorbent. This example validated that a sufficiently high VSA greater than 800 m$^2$/cc. for particle sizes ranging from within 0.15 mm to 0.5 mm produced acceptable performance.

Example 3

A sample of synthetic polymer-derived, structurally modified particulate carbon adsorbent was weighed and loaded into a sample vessel at a packing density of 0.6908 g/cc. The structurally modified particulate carbon adsorbent was pre-conditioned via heat and vacuum to remove in the aggregate moisture and atmospheric impurities from the pores down to less than 1 ppm levels. The final vacuum condition in connection with the pre-conditioning of the vessel with loaded adsorbent was less than 50 mTorr or 0.05 torr. The structurally modified particulate carbon adsorbent had a particle size of 0.202 mm, a specific surface area of 1300 m$^2$/g and a resultant volumetric surface area of 898 m$^2$/cc.

Arsine gas from a source cylinder was regulated through a mass flow controller to control the amount of arsine gas that was adsorbed into the sample vessel. The temperature of the adsorption process was maintained at 20° C.+/−1° C. The pressure in the sample vessel was measured to determine the endpoint of the filling. The filling was stopped once a pressure of approximately 650 torr was achieved and maintained (stable) in the sample vessel.

After the adsorption process was completed, the dispensing process was carried out. Arsine dopant fluid flow from the sample vessel was carried out by utilizing a pressure differential between the pressure in the interior volume of the sample vessel and a lower pressure exterior to the sample vessel, so that dopant fluid was desorbed was from the modified particulate carbon adsorbent in the sample vessel and withdrawn from the sample vessel. As a result of the pressure differential, the arsine dopant fluid desorbed as arsine gas from the modified particulate carbon adsorbent, and subsequently was withdrawn from the interior of the sample vessel and flowed through a dispensing assembly. The arsine gas flowed through a mass flow controller which maintained substantially constant flow rate through a dispensing conduit during the dispensing operation. The dispensing of arsine gas occurred from a starting pressure of 650 torr within the sample vessel down to a final pressure of 20 torr in a temperature-controlled system where the temperature was maintained at 20° C.+/−1° C. The pressure in the sample vessels was measured during the dispensing operation. The desorption was stopped once a pressure of approximately 20 torr was achieved and maintained (stable) in the sample vessel. The flow through the mass flow controller was totalized to determine the total number of grams of gas removed from the sample vessels from full vacuum 650 torr to 20 torr. The totalizer indicated a dispensing capacity of 243.21 grams of arsine per liter of the structurally particulate modified carbon adsorbent. This example validated that a sufficiently high VSA greater than 800 m$^2$/cc. for particle sizes ranging from within 0.15 mm to 0.5 mm produced acceptable performance.

Example 4

A sample of synthetic polymer-derived, structurally modified particulate carbon adsorbent was weighed and loaded into a sample vessel at a packing density of 0.6098 g/cc. The structurally modified particulate carbon adsorbent was pre-conditioned via heat and vacuum to remove in the aggregate moisture and atmospheric impurities from the pores down to less than 1 ppm levels. The final vacuum condition in connection with the pre-conditioning of the vessel with loaded adsorbent was less than 50 mTorr or 0.05 torr. The structurally modified particulate carbon adsorbent had a size of 0.195 mm, a specific surface area of 1470 m$^2$/g and a resultant volumetric surface area of 896 m$^2$/cc.

Arsine gas from a source cylinder was regulated through a mass flow controller to control the amount of arsine gas that was adsorbed into the sample vessel. The temperature of the adsorption process was maintained at 20° C.+/−1° C. The pressure in the sample vessel was measured to determine the endpoint of the filling. The filling was stopped once a pressure of approximately 650 torr was achieved and maintained (stable) in the sample vessel.

After the adsorption process was completed, the dispensing process was carried out. Arsine dopant fluid flow from the sample vessel was carried out by utilizing a pressure differential between the pressure in the interior volume of the sample vessel and a lower pressure exterior to the sample vessel, so that dopant fluid was desorbed was from the modified particulate carbon adsorbent in the sample vessel and withdrawn from the sample vessel. As a result of the pressure differential, the arsine dopant fluid desorbed as arsine gas from the modified particulate carbon adsorbent, and subsequently was withdrawn from the interior of the sample vessel and flowed through a dispensing assembly. The arsine gas flowed through a mass flow controller which maintained substantially constant flow rate through a dispensing conduit during the dispensing operation. The dispensing of arsine gas occurred from a starting pressure of 650 torr within the sample vessel down to a final pressure of 20 torr in a temperature-controlled system where the temperature was maintained at 20° C.+/−1° C. The pressure in the sample vessels was measured during the dispensing operation. The desorption was stopped once a pressure of approximately 20 torr was achieved and maintained (stable) in the sample vessel. The flow through the mass flow controller was totalized to determine the total number of grams of gas removed from the sample vessels from full vacuum 650 torr to 20 torr. The totalizer indicated a dispensing capacity of 247.39 grams of arsine per liter of the structurally particulate modified carbon adsorbent. This example validated that a sufficiently high VSA greater than 800 m$^2$/cc. for particle sizes ranging from 0.15 to 0.5 mm produced acceptable performance.

Example 5

A sample of synthetic polymer-derived, structurally modified particulate carbon adsorbent was weighed and loaded into a sample vessel at a packing density of 0.5232 g/cc. The structurally modified particulate carbon adsorbent was pre-conditioned via heat and vacuum to remove in the aggregate moisture and atmospheric impurities from the pores down to less than 1 ppm levels. The final vacuum condition in connection with the pre-conditioning of the vessel with loaded adsorbent was less than 50 mTorr or 0.05 torr. The structurally modified particulate carbon adsorbent had a size of 0.191 mm, a specific surface area of 1796 m$^2$/g and a resultant volumetric surface area of 940 m$^2$/cc.

Arsine gas from a source cylinder was regulated through a mass flow controller to control the amount of arsine gas that was adsorbed into the sample vessel. The temperature of the adsorption process was maintained at 20° C.+/−1° C. The pressure in the sample vessel was measured to determine the endpoint of the filling. The filling was stopped once a pressure of approximately 650 torr was achieved and maintained (stable) in the sample vessel.

After the adsorption process was completed, the dispensing process was carried out. Arsine dopant fluid flow from the sample vessel was carried out by utilizing a pressure differential between the pressure in the interior volume of the sample vessel and a lower pressure exterior to the sample vessel, so that dopant fluid was desorbed was from the modified particulate carbon adsorbent in the sample vessel and withdrawn from the sample vessel. As a result of the pressure differential, the arsine dopant fluid desorbed as arsine gas from the modified particulate carbon adsorbent, and subsequently was withdrawn from the interior of the sample vessel and flowed through a dispensing assembly. The arsine gas flowed through a mass flow controller which maintained substantially constant flow rate through a dispensing conduit during the dispensing operation. The dispensing of arsine gas occurred from a starting pressure of 650 torr within the sample vessel down to a final pressure of 20 torr in a temperature-controlled system where the temperature was maintained at 20° C.+/−1° C. The pressure in the sample vessels was measured during the dispensing operation. The desorption was stopped once a pressure of approximately 20 torr was achieved and maintained (stable) in the sample vessel. The flow through the mass flow controller was totalized to determine the total number of grams of gas removed from the sample vessels from full vacuum 650 torr to 20 torr. The totalizer indicated a dispensing capacity of 263.56 grams of arsine per liter of the structurally particulate modified carbon adsorbent. This example validated that a sufficiently high VSA greater than 800 m$^2$/cc. for particle sizes ranging from 0.15 to 0.5 mm produced acceptable performance.

Comparative Example 1

A sample of a carbon adsorbent was weighed and loaded into a sample vessel at a packing density of 0.3794 g/cc. The carbon adsorbent was pre-conditioned via heat and vacuum to remove in the aggregate moisture and atmospheric impurities from the pores down to 1 ppm levels. The final vacuum condition in connection with the pre-conditioning of the vessel with loaded adsorbent was less than 50 mTorr or 0.05 torr. The carbon adsorbent had a size of 0.434 mm, a specific surface area of 1920 m$^2$/g and a resultant volumetric surface area of 728 m$^2$/cc.

Arsine gas from a source cylinder was regulated through a mass flow controller to control the amount of arsine gas that was adsorbed into the sample vessel. The temperature of the adsorption process was maintained at 20° C.+/−1° C. The pressure in the sample vessel was measured to determine the endpoint of the filling. The filling was stopped once a pressure of approximately 650 torr was achieved and maintained (i.e., stabilized) in the sample vessel.

After the adsorption process was completed, the dispensing process was carried out. Arsine dopant fluid flow from the sample vessel was carried out by utilizing a pressure differential between the pressure in the interior volume of the sample vessel and a lower pressure exterior to the sample vessel, so that arsine dopant fluid was desorbed from the carbon adsorbent in the sample vessel and withdrawn from the sample vessel. As a result of the pressure differential, the arsine dopant fluid desorbed as arsine gas from the carbon adsorbent, and subsequently was withdrawn from the interior of the sample vessel and flowed through a dispensing assembly. The arsine gas flowed through a mass flow controller which maintained substantially constant flow rate through a dispensing conduit during the dispensing operation. The dispensing of arsine gas occurred from a starting pressure of 650 torr within the sample vessel down to a final pressure of 20 torr in a temperature-controlled system where the temperature was maintained at 20° C.+/−1° C. The pressure in the sample vessels was measured during the dispensing operation. The desorption was stopped once a pressure of approximately 20 torr was achieved and maintained (stable) in the sample vessel. The flow through the mass flow controller was totalized to determine the total number of grams of gas removed from the sample vessels from full vacuum 650 torr to 20 torr. The totalizer indicated a dispensing capacity of 187.41 grams of arsine per liter of the carbon adsorbent.

The test results indicated that arsine deliverable capacity was noticeably lower from the Examples 1-5. It was concluded that a particle size within the required range of (0.15-0.5) mm by itself was not sufficient to generate acceptable performance. A sufficiently high VSA was also needed. This example validated the requirement for both a VSA greater than 800 m$^2$/cc and a particle size within the (0.15-0.5) mm range.

Comparative Example 2

A sample of a carbon adsorbent was weighed and loaded into a sample vessel at a packing density of 0.59 g/cc. The carbon adsorbent was pre-conditioned via heat and vacuum to remove in the aggregate moisture and air from the pores down to less than 1 ppm levels. The final vacuum condition in connection with the pre-conditioning of the vessel with loaded adsorbent was less than 50 mTorr or 0.05 torr. The carbon adsorbent had a particle size of 0.7 mm, a specific surface area of 1200 m$^2$/g and a resultant volumetric surface area of 708 m$^2$/cc.

Arsine gas from a source cylinder was regulated through a mass flow controller to control the amount of arsine gas that was adsorbed into the sample vessel. The temperature of the adsorption process was maintained at 20° C.+/−1° C. The pressure in the sample vessel was measured to determine the endpoint of the filling. The filling was stopped once a pressure of approximately 650 torr was achieved and maintained (stable) in the sample vessel.

After the adsorption process was completed, the dispensing process was carried out. Arsine dopant fluid flow from the sample vessel was carried out by utilizing a pressure differential between the pressure in the interior volume of the sample vessel and a lower pressure exterior to the sample vessel, so that arsine dopant fluid was desorbed from the carbon adsorbent in the sample vessel and withdrawn from the sample vessel. As a result of the pressure differential, the arsine dopant fluid desorbed as arsine gas from the carbon adsorbent, and subsequently was withdrawn from the interior of the sample vessel and flowed through a dispensing assembly. The arsine gas flowed through a mass flow controller which maintained substantially constant flow rate through a dispensing conduit during the dispensing operation. The dispensing of arsine gas occurred from a starting pressure of 650 torr within the sample vessel down to a final pressure of 20 torr in a temperature-controlled system where the temperature was maintained at 20° C.+/−1° C. The pressure in the sample vessels was measured during the dispensing operation. The desorption was stopped once a pressure of approximately 20 torr was achieved and maintained (stable) in the sample vessel. The flow through the mass flow controller was totalized to determine the total number of grams of gas removed from the sample vessels from full vacuum 650 torr to 20 torr. The totalizer indicated a dispensing capacity of 190.64 grams of arsine per liter of the carbon adsorbent. The test results indicated that arsine deliverable capacity was noticeably lower from the Examples 1-5 as a result of a relatively lower VSA below 800 m$^2$/cc and a particle size above the upper limit of 0.5 mm. This example further validated the requirement for both a VSA greater than 800 m$^2$/cc and a particle size within the (0.15-0.5) mm range.

Collectively, the tests showed that the combination of a certain range of particle sizes and optimal VSA's in Examples 1, 2, 3, 4 and 5 produced significantly higher deliverable capacities of arsine than those of the Comparative Examples 1 and 2.

While it has been shown and described what is considered to be certain embodiments of the invention, it will, of course, be understood that various modifications and changes in form or detail can readily be made without departing from the spirit and scope of the invention. It is, therefore, intended that this invention is not limited to the exact form and detail herein shown and described, nor to anything less than the whole of the invention herein disclosed and hereinafter claimed.

The invention claimed is:

1. A carbon adsorbent storage and dispensing system comprising a vessel and a particulate carbon adsorbent disposed within an interior volume of the vessel, said particulate carbon adsorbent comprising a synthetic polymer-based material, the particulate carbon adsorbent further comprising particles having a particle size at or below about 0.5 mm but no less than about 0.15 mm, the particulate carbon adsorbent further having a volumetric surface area (VSA) therewithin of greater than about 800 m2 of porous surface area per cc of a packed volume of the vessel, the carbon adsorbent further configured to adsorb a fluid that is stored at a storage pressure of less than 1 bar at 20 deg C.

2. The carbon adsorbent storage and dispensing system of claim 1, further comprising a bulk density ranging from about to 0.45 to 0.7 grams of the particulate carbon adsorbent per cc of the packed volume of the vessel.

3. The carbon adsorbent storage and dispensing system of claim 1, wherein the particulate carbon adsorbent further comprises a specific surface area of at least about 1000 m2 of porous surface area per gram of the particulate carbon adsorbent.

4. The carbon adsorbent storage and dispensing system of claim 1, wherein said particulate carbon adsorbent comprises a sum of moisture and atmospheric impurities of no greater than 1 ppm.

5. The carbon adsorbent storage and dispensing system of claim 1, wherein the fluid is arsine or phosphine.

6. The carbon adsorbent storage and dispensing system of claim 1, wherein the size of the particles of the particulate carbon adsorbent ranges from 0.15 mm to about 0.5 mm.

7. The carbon adsorbent storage and dispensing system of claim 1, wherein the VSA of the particulate carbon adsorbent ranges from 800 to 850 m2 of porous surface area per cc of a packed volume of the vessel.

8. The carbon adsorbent storage and dispensing system of claim 1, wherein the particle size ranges from about 0.15 mm to about 0.2 mm.

9. The carbon adsorbent storage and dispensing system of claim 1, wherein the fluid adsorbed onto the particulate carbon adsorbent is arsine gas, whereby the storage and dispensing system is configured to dispense greater than 210 grams of the arsine gas per liter of the particulate carbon adsorbent.

10. The carbon adsorbent storage and dispensing system of claim 1, wherein the fluid adsorbed onto the modified particulate carbon adsorbent is arsine gas and the storage and dispensing system has a deliverable capacity of 300 grams per liter of the particulate carbon adsorbent or higher.

11. The carbon adsorbent storage and dispensing system of claim 1, wherein the fluid is an arsine gas and the size of the particles of the particulate carbon adsorbent is at or below about 0.5 mm but no less than 0.15 mm with a substantially microporous network defined, at least in part, by the VSA equal to or greater than about 840m2 of microporous surface area per cc of the packed volume of the vessel, and further wherein the particulate carbon adsorbent is characterized by a deliverable capacity of the arsine to be greater than 210 grams of the arsine gas per liter of the particulate carbon adsorbent.

12. The carbon adsorbent storage and dispensing system of claim 1, wherein the fluid is an arsine gas that is adsorbed onto the particulate carbon adsorbent with a deliverable capacity of greater than 210 grams of the arsine gas per liter of the particulate carbon adsorbent.

13. The carbon adsorbent storage and dispensing system of claim 1, wherein the VSA of the particulate carbon adsorbent has 900 m2 or greater of surface area per cc of the vessel.

14. The carbon adsorbent storage and dispensing system of claim 1, wherein the particulate carbon adsorbent is substantially microporous.

15. The carbon adsorbent storage and dispensing system of claim wherein said vessel is configured to be loaded into a gas cabinet.

16. The carbon adsorbent storage and dispensing system of claim 1, wherein the particulate carbon adsorbent comprises particles that are substantially spherical shaped.

17. The carbon adsorbent storage and dispensing system of claim 1, wherein the particulate carbon adsorbent comprises a packing density between 0.45 and 0.70 grams of the particulate carbon adsorbent per cc of the packed volume of the vessel.

18. The carbon adsorbent storage and dispensing system of claim 1, wherein the VSA is greater than about 800 and equal to or less than 950 m2 of porous surface area per cc of the packed volume of the vessel.

19. The carbon adsorbent storage and dispensing system of claim 1 wherein the particulate carbon adsorbent is composed of substantially spherical particles.

20. The carbon adsorbent storage and dispensing system of claim 1, wherein the particulate carbon adsorbent further comprising a sum of mesopores and macropores less than 10 vol % based on a total pore volume of solid pieces of the particulate carbon adsorbent as measured by mercury porosimetry.

21. A carbon adsorbent storage and dispensing system comprising a vessel and a particulate carbon adsorbent disposed within an interior volume of the vessel, said particulate carbon adsorbent comprising a synthetic polymer-based material, the particulate carbon adsorbent further comprising particles having a particle size at or below about 0.5 mm but no less than 0.15 mm, the particulate carbon adsorbent further having a volumetric surface area (VSA) therewithin of greater than about 800 m2 of porous surface area per cc of a packed volume of the vessel, the carbon adsorbent further configured to adsorb arsine that is stored at a storage pressure of less than 1 bar at 20 deg C, wherein said particulate carbon adsorbent is characterized by a dispensing capacity of 210 or more grams of the arsine per liter of the particulate carbon adsorbent.

* * * * *